United States Patent
Priser et al.

(10) Patent No.: US 10,658,828 B2
(45) Date of Patent: May 19, 2020

(54) SYSTEM FOR CONNECTING SUBMARINE CABLES

(71) Applicant: NAVAL ENERGIES, Paris (FR)

(72) Inventors: Mathieu Priser, Paris (FR); Jean-Yves Perou, Paris (FR); Patrick Gambaretti, Paris (FR)

(73) Assignee: NAVAL ENERGIES, Paris (FR)

(*) Notice: Subject to any disclaimer, the term of this patent is extended or adjusted under 35 U.S.C. 154(b) by 0 days.

(21) Appl. No.: 16/603,337

(22) PCT Filed: Apr. 9, 2018

(86) PCT No.: PCT/EP2018/059025
§ 371 (c)(1),
(2) Date: Oct. 7, 2019

(87) PCT Pub. No.: WO2018/189111
PCT Pub. Date: Oct. 18, 2018

(65) Prior Publication Data
US 2020/0044433 A1 Feb. 6, 2020

(30) Foreign Application Priority Data
Apr. 10, 2017 (FR) .................................... 17 53087

(51) Int. Cl.
*G02B 6/44* (2006.01)
*H02G 15/10* (2006.01)
*H02G 9/02* (2006.01)
*H02G 15/013* (2006.01)

(52) U.S. Cl.
CPC .......... *H02G 15/10* (2013.01); *G02B 6/4427* (2013.01); *G02B 6/4441* (2013.01); *H02G 9/02* (2013.01); *H02G 15/013* (2013.01)

(58) Field of Classification Search
CPC ............................ G02B 6/4427; H02G 15/013
USPC ........................................................ 174/84 R
See application file for complete search history.

(56) References Cited

U.S. PATENT DOCUMENTS

| 3,602,873 A | | 8/1971 | Childers | |
|---|---|---|---|---|
| 3,866,162 A | * | 2/1975 | Florian | ................. G01V 1/201 367/177 |
| 4,501,927 A | * | 2/1985 | Sievert | ................. H02G 15/192 156/49 |

(Continued)

FOREIGN PATENT DOCUMENTS

| EP | 2237380 A1 | 10/2010 |
|---|---|---|
| EP | 2793333 A1 | 10/2014 |

(Continued)

OTHER PUBLICATIONS

International Search Report, dated Jun. 4, 2018, from corresponding PCT application No. PCT/EP2018/059025.

(Continued)

*Primary Examiner* — Sherman Ng
(74) *Attorney, Agent, or Firm* — Young & Thompson

(57) ABSTRACT

The system for connecting submarine cables and especially umbilical cables for renewable marine energy farms, is characterized in that it includes an intermediate part for connecting the cables, adapted to be placed between ends for connecting the cables and includes both electrical and mechanical connections for the cables.

6 Claims, 5 Drawing Sheets

(56) References Cited

U.S. PATENT DOCUMENTS

Figure 1:
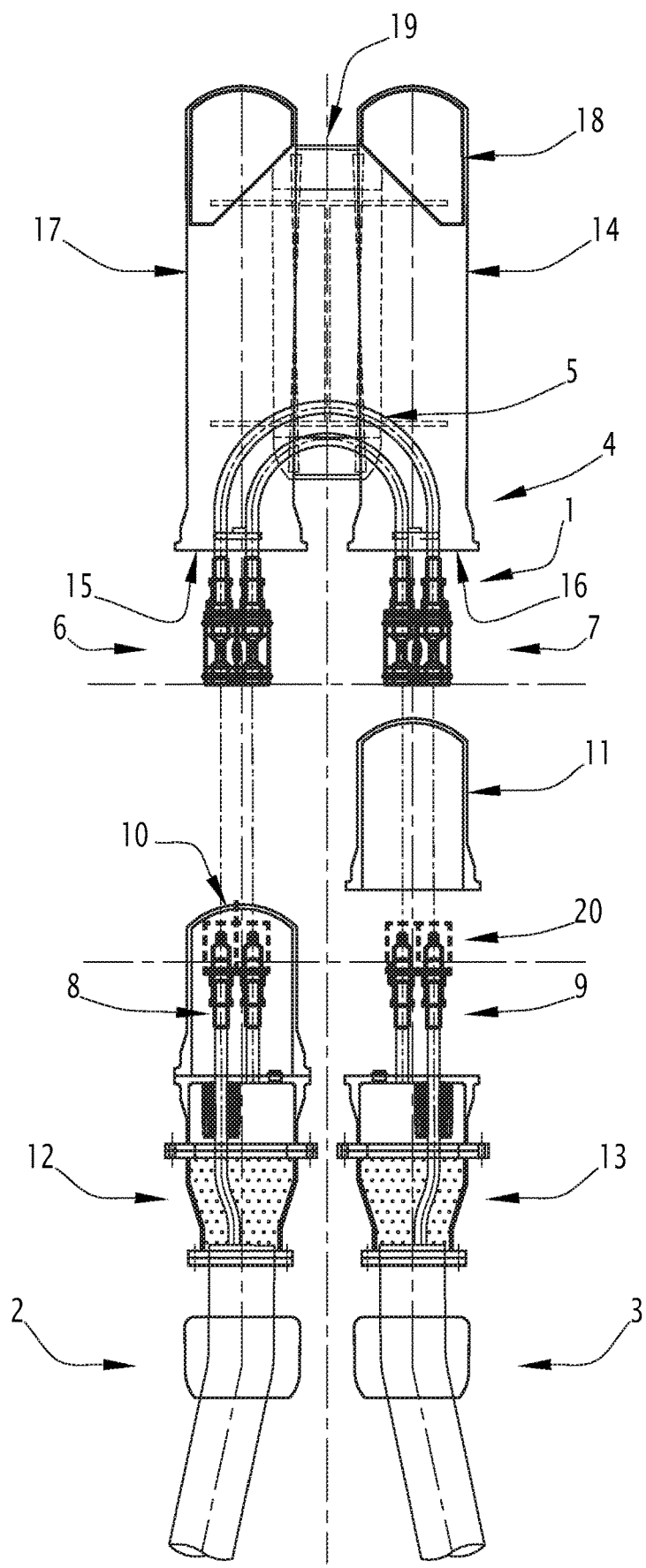

| | | | | | |
|---|---|---|---|---|---|
| 4,778,948 | A | * | 10/1988 | Fitch | ......................... H01R 4/72 |
| | | | | | 156/49 |
| 4,784,459 | A | * | 11/1988 | Jenkins | ................ G02B 6/4428 |
| | | | | | 385/55 |
| 4,841,103 | A | * | 6/1989 | Oestreich | ............. G02B 6/4448 |
| | | | | | 174/70 S |
| 4,896,939 | A | * | 1/1990 | O'Brien | ................ G02B 6/3816 |
| | | | | | 174/110 R |
| 5,875,547 | A | * | 3/1999 | Larsson | ................... H01R 4/70 |
| | | | | | 29/869 |
| 8,471,148 | B2 | * | 6/2013 | Steinich | ................. H01B 7/282 |
| | | | | | 174/72 C |

FOREIGN PATENT DOCUMENTS

| | | | |
|---|---|---|---|
| GB | 2167877 | A | 6/1986 |
| GB | 2481852 | A | 1/2012 |

OTHER PUBLICATIONS

French Search Report, dated Dec. 1, 2017, from corresponding French application No. 1753087.

Beacon Advanced Products, LLC; Subsea Umbilical Termination Assembly; Dec. 31, 2014; The Whole document retrieved from the internet: URL: http://seaconworldwide.com/wp-content/uploads/SUTA.pdf.

\* cited by examiner

SYSTEM FOR CONNECTING SUBMARINE CABLES

The present invention relates to a system for connecting cables, for example hybrid submarine cables.

In the present description, the term "hybrid" cable must be understood as for example designating cables conveying power and/or information, etc., that is to say electrical, optical, etc.

More particularly, such a system can be used to connect submarine hybrid cables such as umbilical cables for renewable marine energy farms.

Such systems for connecting submarine hybrid cables already exist in the state of the art, which include systems for receiving the ends of these cables and which are intended to be fastened to/on one another, to allow the connection of the cables.

One exemplary embodiment of such a system is described in GB 2,481,852.

The connecting system described in this document is a so-called "in-line" connecting system, that is to say, the cables are in the extension of one another, at their connection.

One can see, however, that such a system has a certain number of drawbacks.

Indeed, such an in-line connecting system for the cables is extremely cumbersome, which results in handling, assembly and hydraulic drag problems caused by the powerful currents of marine turbine environments, for example.

Furthermore, such a system also results in significant bending forces in the cables, the structures and the corresponding accessories during the handling thereof.

Force reacting means of the half-moon type, called "quadrant", for example making it possible to resolve a certain number of these problems, have also been proposed in a complementary manner.

However, not all of these systems are fully satisfactory, and they take up considerable space on the deck of the installation ship.

The invention therefore aims to resolve these problems.

To that end, the invention relates to a system for connecting submarine cables, and especially umbilical cables, for renewable marine energy farms, characterized in that it includes an intermediate part for connecting these cables, adapted to be placed between ends for connecting the cables and including means for the electrical connection of said cables and means for the mechanical connection thereof.

According to other features of the device according to the invention, considered alone or in combination:
the connecting part further includes means for the optical connection of fiber optics of the umbilical cables;
the intermediate connecting part is sealed;
the intermediate connecting part is in the form of a sealed housing including two passage orifices for the cables to be connected and is provided with fastening means on complementary fastening caps fastened around the cables to be connected near ends thereof, in order to close off the orifices of the housing and to fasten the cables on the housing by means of the fastening caps and therefore to fasten the cables on one another;
the housing is linked in movement to the connecting means of the cables;
the housing moves freely relative to the connecting means in order to allow first the connection of the cables and secondly, once this connection is done, the fastening of the housing on the caps and therefore the fastening of the cables on one another;
the housing and the caps are fastened using gripping and fastening collars;
the housing and the caps are fastened using bolted flanges;
the connecting means assume the form of a cable portion with a general U shape;
the ends of the U-shaped cable portion and umbilical cables include complementary electrical and/or optical couplers.

The invention will be better understood upon reading the following description, provided solely as an example, and done in reference to the appended drawings, in which:

FIGS. 1 to 5 illustrate a sequence of views showing the front structure of an exemplary embodiment of a connecting system according to the invention and the connection of cables using such a connecting system.

These figures in fact show a system for connecting submarine cables, especially umbilical cables, for renewable marine energy farms.

The connecting system is designated by general reference 1 in these various figures and makes it possible to connect submarine cables, for example umbilical cables 2 and 3.

Indeed, and unlike the systems of the state of the art, in which the cables are connected and fastened directly on one another for example in line, in the connecting system according to the invention, an intermediate connecting part is used for these cables.

This intermediate connecting part is designated by general reference 4 in these figures.

Indeed, this intermediate part 4 for connecting these cables 2 and 3 is therefore suitable for being placed between ends for connecting the cables 2 and 3 and includes means for the electrical connection of said cables and means for the mechanical connection thereof.

The ends of the cables are therefore not fastened directly on one another like in the state of the art.

As will be described in more detail hereinafter, the means for connecting these cables for example include not only electrical connecting means, but can also include optical connecting means, for example fiber optics of the umbilical cables, if these cables are so-called "hybrid" cables, that is to say, including both electrical cables and fiber optics.

Indeed, the electrical connecting means of the cables can for example assume the form of a cable portion, for example generally U-shaped, which is designated by general reference 5 in these figures.

The ends of this U-shaped cable portion 5, and of the umbilical cables 2 and 3, then include complementary couplers designated by general references 6 and 7, and 8 and 9.

These couplers can then be electrical, optical, etc. connectors depending on the nature of the cables to be connected.

Sealed covers, for example 10 and 11, can be used to protect these couplers, and in particular the couplers 8 and 9 of the ends of the umbilical cables 2 and 3, before they are connected in order to protect them for example during their different manipulations. These sealed covers can then be fastened removably, for example on end caps of the cables 12 and 13 fastened around the cables near the ends thereof that are suitable for being connected.

These end caps are fastened sealably on the cables.

The connecting system according to the invention and the intermediate part 4 also include a sealed housing designated by general reference 14 in these figures.

In these figures, this housing 14 including is generally in the shape of an inverted U, the ends of the legs of which have two passage orifices for cables to be connected.

These two orifices of this housing are designated by references 15 and 16 in these figures.

These orifices 15 and 16, or at least the legs of the housing around these orifices, are provided with fastening means on the end caps 12 and 13 of the cables, as will be described in more detail hereinafter.

In the exemplary embodiment described in light of these figures, the sealed housing 14 moves freely relative to the connecting means of the cables, that is to say, relative to the cable portion 5 in the example, to allow these elements, that is to say, the housing and the cable portion, to move relative to one another as will be described in more detail hereinafter.

Indeed, the housing can for example assume the illustrated form with two lateral legs designated by references 17 and 18 in these figures, closed at their ends opposite those provided with orifices 15 and 16, and these legs are connected by a portion forming a bridge 19 between them.

One can then see that in the illustrated exemplary embodiment, the U-shaped cable portion 5 of the connecting means extends through the orifices of these legs and the bridge-forming portion of the housing 14.

The initial state of the connecting system before assembly and connecting of the cables to one another is then for example that illustrated in FIG. 1.

The covers 10 and 11 protecting the ends of the cables 2 and 3 should first be removed, as illustrated in FIG. 1.

Figure 2:
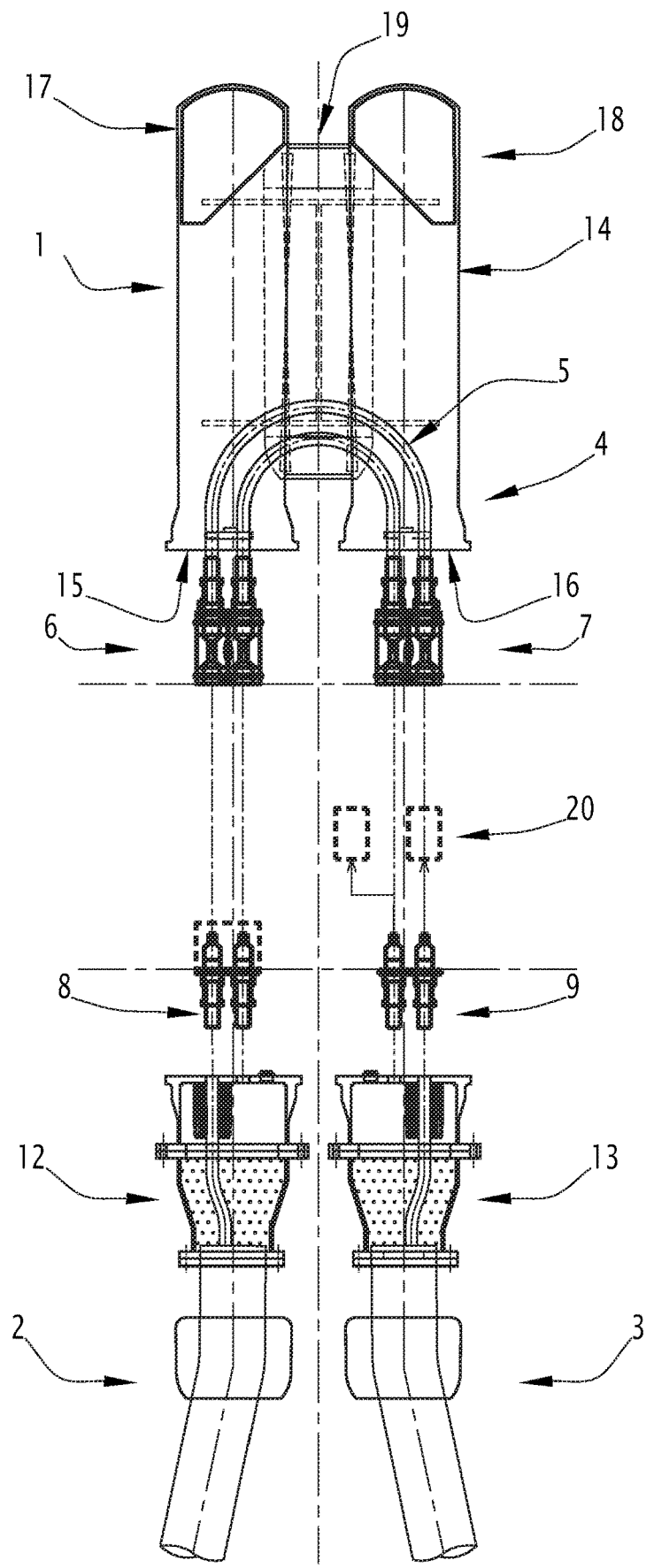

Once these covers have been removed, one also removes, as illustrated in FIG. 2, the protective covers, for example 20 and 21, of the end couplers, for example, of these umbilical cables.

Once these various protective covers have been removed, it is then possible to place the umbilical cables 2 and 3 and the intermediate connecting part 4 in the connecting position across from one another.

The intermediate part is then arranged between the ends of the cables to associate them.

Figure 3:
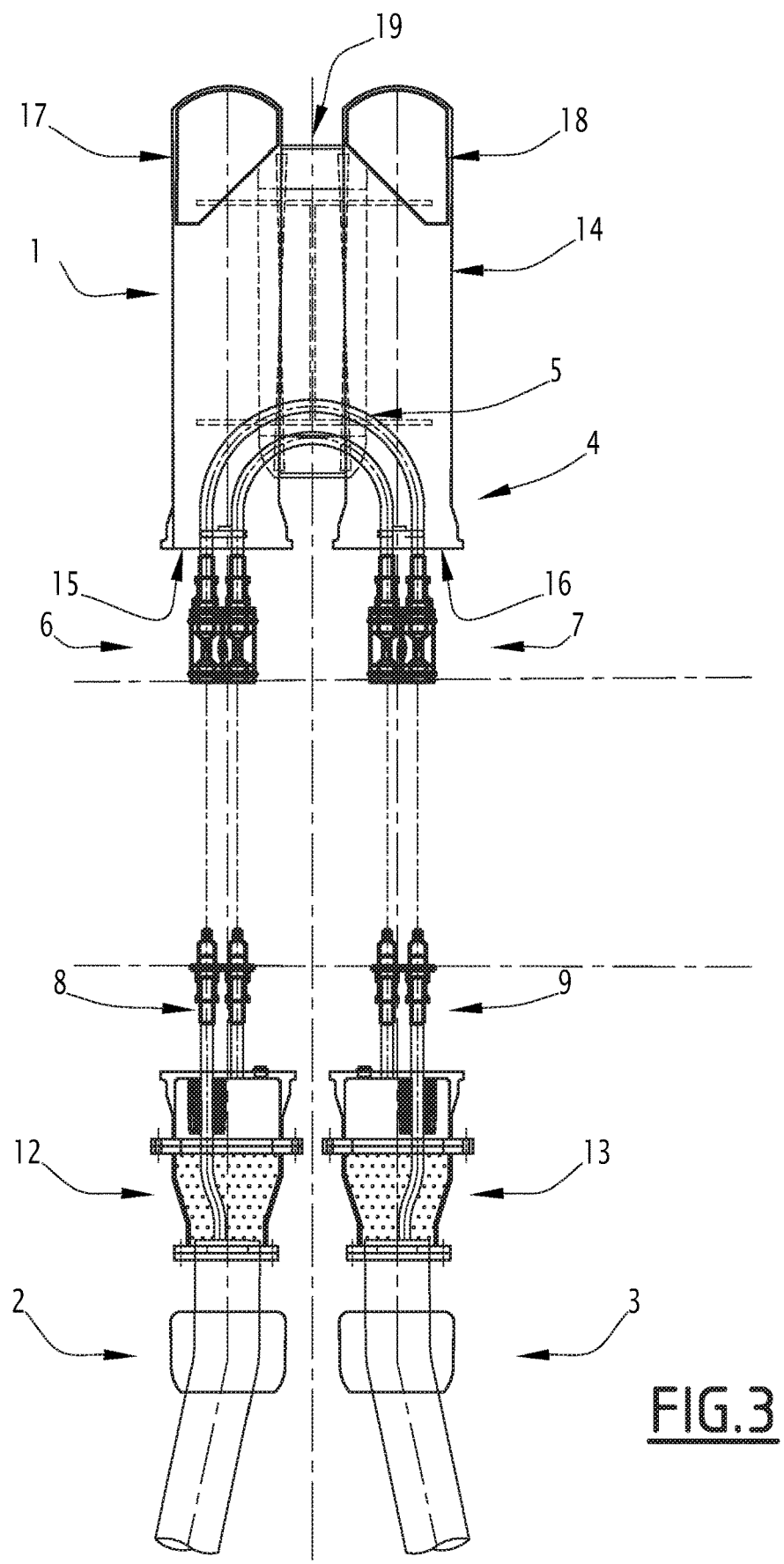
Figure 4:
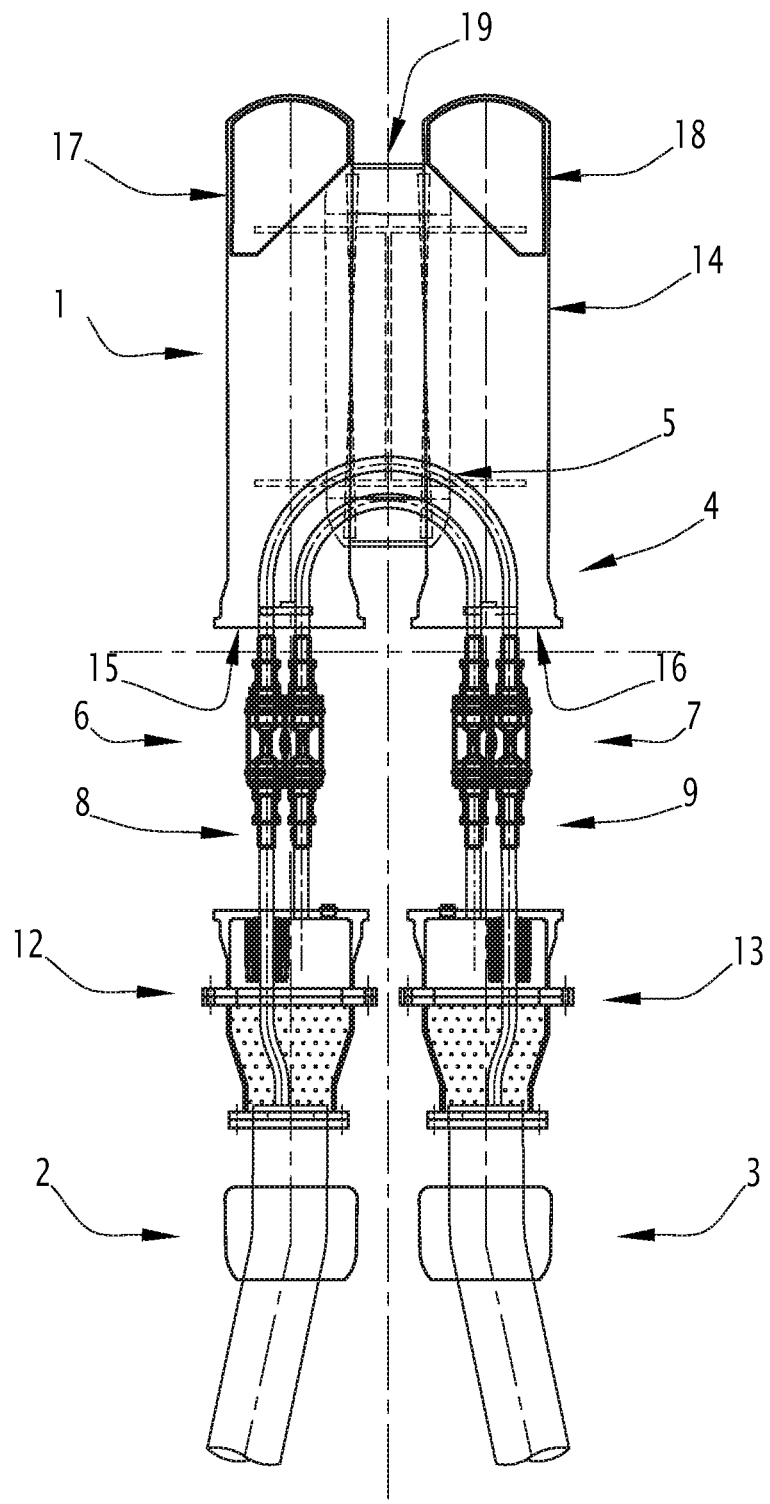
Figure 5:
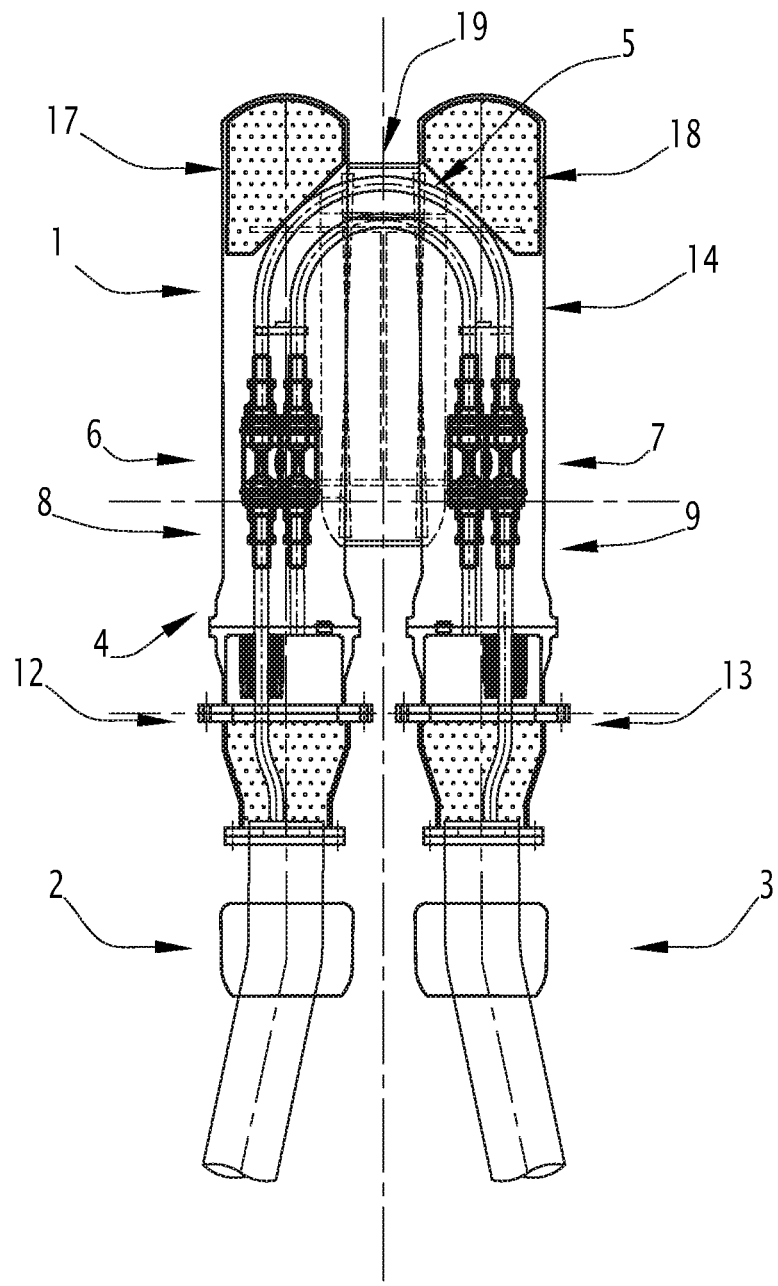

Then, as illustrated in FIGS. 3 and 4, the cables are connected using the complementary electrical and/or optical couplers of the ends of the umbilical cables 2 and 3 and the U-shaped cable portion 5 of the intermediate connecting part.

This is facilitated in the illustrated example by the fact that the sealed housing 14 moves freely relative to the U-shaped cable portion 5 and can therefore be freed from the connecting zone of the complementary couplers to provide better access to these couplers and to simplify this connection.

Once this electrical/optical connection operation of the umbilical cables 2 and 3 is done, it is then possible to connect the cables mechanically to one another.

To that end, the sealed housing 14 is moved around the U-shaped cable portion until the ends of the legs 17 and 18 bear against the caps 12 and 13 of the ends of the umbilical cables 2 and 3.

The sealed fastening of the intermediate part and in particular of the housing 14 on the caps 12 and 13 can then be done in different ways.

For example, it is possible to use means in the form of gripping and fastening collars.

Of course, other embodiments can be considered, for example bolted flanges, etc.

Indeed, the housing 14 is therefore used to fasten the cables on one another, using caps 12 and 13 that are fastened on the ends of the cables 2 and 3.

In the example that has just been described, the umbilical cables 2 and 3 arrive in the sealed housing 14 along substantially parallel axes.

Of course, other arrangements may be considered.

Likewise, and as has previously been indicated, the coupling connectors of these cables of the U-shaped cable portion can include complementary optical connectors making it possible to connect the optical fibers of these umbilical cables.

One can then see that such a structure has a certain number of advantages in terms of the ease of connection and fastening of the cables to one another, the low bulk of this connecting system, its speed and its ease of assembly.

Of course, other embodiments can be considered.

Thus, for example, the sealed housing 14 can be connected in movement to the U-shaped cable portion 5, in order to move therewith.

The invention claimed is:

1. A system for connecting submarine cables, and especially umbilical cables for renewable marine energy farms, wherein the system includes an intermediate part for connecting these cables, the intermediate part being adapted to be placed between ends of the cables to be connected for connecting the cables and including means for the electrical connection of said cables and means for the mechanical connection thereof;

wherein the intermediate connecting part is sealed;

wherein the intermediate connecting part is in the form of a sealed housing including two passage orifices for the cables to be connected and is provided with fastening means on complementary fastening caps fastened around the cables to be connected near ends thereof, in order to close off the orifices of the housing and to fasten the cables on the housing by means of the fastening caps and therefore to fasten the cables on one another; and wherein the housing moves freely relative to the electrical connecting means of the cables in order to allow first the electrical connection of the cables and secondly, once this electrical connection is done, the fastening of the housing on the caps and therefore the fastening of the cables on one another, forming the mechanical connection of the cables.

2. The system for connecting submarine cables according to claim 1, wherein the connecting part further includes means for the optical connection of fiber optics of the umbilical cables.

3. The system for connecting submarine cables according to claim 1, wherein the housing and the caps are fastened using gripping and fastening collars.

4. The system for connecting submarine cables according to claim 1, wherein the housing and the caps are fastened using bolted flanges.

5. The system for connecting submarine cables according to claim 1, wherein the connecting means assume the form of a cable portion with a general U shape.

6. The system for connecting submarine cables according to claim 5, wherein the ends of the U-shaped cable portion and umbilical cables include complementary electrical and/or optical couplers.

* * * * *